United States Patent [19]

George et al.

[11] Patent Number: 5,709,940
[45] Date of Patent: Jan. 20, 1998

[54] WATER-DISPERSIBLE BLOCK COPOLYESTERS

[75] Inventors: Scott E. George; Bobby J. Sublett, both of Kingsport, Tenn.

[73] Assignee: Eastman Chemical Company, Kingsport, Tenn.

[21] Appl. No.: 651,246

[22] Filed: May 21, 1996

Related U.S. Application Data

[63] Continuation of Ser. No. 328,744, Oct. 24, 1994, abandoned.

[51] Int. Cl.$^6$ .................................................. D02G 3/00
[52] U.S. Cl. ........................ 428/364; 428/375; 428/394; 428/395; 524/604; 524/605; 528/290; 528/295; 528/298; 528/300; 528/301; 528/302; 528/307; 528/308
[58] Field of Search ........................ 428/395, 394, 428/480, 364, 375; 528/290, 295, 272, 275, 298, 301, 300, 302, 307, 308, 308.6; 524/604, 605

[56] References Cited

U.S. PATENT DOCUMENTS

| | | | |
|---|---|---|---|
| 3,033,822 | 5/1962 | Kibler et al. | 260/47 |
| 3,546,008 | 12/1970 | Shields et al. | 117/138.8 |
| 3,734,874 | 5/1973 | Kibler et al. | 260/29.2 |
| 3,779,993 | 12/1973 | Kibler et al. | 260/75 |
| 3,907,736 | 9/1975 | Barton et al. | 428/254 |
| 3,959,213 | 5/1976 | Gilkey et al. | 260/45.7 |
| 4,119,680 | 10/1978 | Vachon | 260/850 |
| 4,233,196 | 11/1980 | Sublett | 260/29.2 |
| 4,300,580 | 11/1981 | O'Neill et al. | 424/10 |
| 4,304,901 | 12/1981 | O'Neill et al. | 528/290 |
| 4,329,391 | 5/1982 | McAlister | 428/265 |
| 4,480,085 | 10/1984 | Larson | 528/295 |
| 4,483,976 | 11/1984 | Yamamoto et al. | 528/295 |
| 4,525,524 | 6/1985 | Tung et al. | 524/601 |
| 4,598,142 | 7/1986 | Hilbert et al. | 528/295 |
| 4,632,874 | 12/1986 | Smith | 428/394 |
| 5,290,631 | 3/1994 | Fleury et al. | 428/364 |
| 5,369,210 | 11/1994 | George et al. | 528/293 |

*Primary Examiner*—Patrick Ryan
*Assistant Examiner*—J. M. Gray
*Attorney, Agent, or Firm*—John D. Thallemer; Andrew B. Griffis; Harry J. Gwinnelll

[57] ABSTRACT

This invention relates to linear, water-dispersible sulfopolyesters prepared using high molecular weight polyethylene glycol blocks and low molecular weight polyethylene glycol. The high molecular weight polyethylene glycol has the formula $H-(OCH_2CH_2)_n-OH$ where n is 20 to 500, and the low molecular weight polyethylene glycol has the structure $H-(OCH_2CH_2)_{n'}-OH$ where n' is 2 to 6. The sulfopolyesters are useful as textile fiber sizes that possess improved adhesion, flexibility, and abrasion resistance.

29 Claims, No Drawings

WATER-DISPERSIBLE BLOCK COPOLYESTERS

This is a continuation of application Ser. No. 08/328,744 filed on Oct. 24, 1994 abandoned.

FIELD OF THE INVENTION

This invention relates to linear, water-dispersible sulfopolyesters prepared using high molecular weight polyethylene glycol blocks and low molecular weight polyethylene glycol.

BACKGROUND OF THE INVENTION

Water-dispersible sulfopolyesters incorporating polyethylene glycol (PEG) units are known in the art. U.S. Pat. Nos. 4,329,391, 4,483,976, 4,525,524, and 5,290,631 disclose water-dispersible sulfopolyester compositions which contain polyethylene glycol having a molecular weight of less than 600 grams/mole. U.S. Pat. Nos. 3,734,874 and 3,779,993 disclose water-dispersible sulfopolyester compositions which contain polyethylene glycol having a molecular weight of 106 to 898 grams/mole. U.S. Pat. No. 4,233,196 discloses water-dispersible sulfopolyester compositions which contain polyethylene glycol having a molecular weight of 106 to 22,018 grams/mole.

None of the references disclose water-dispersible sulfopolyesters containing high molecular weight polyethylene glycol blocks and low molecular weight polyethylene glycol. The present inventors have determined that the use of certain critical ranges of high molecular weight polyethylene glycol and low molecular weight polyethylene glycol in the preparation of water-dispersible sulfopolyesters result in the sulfopolyesters exhibiting improved adhesion, flexibility, and abrasion resistance.

SUMMARY OF THE INVENTION

The present invention relates to a linear, water-dispersible, sulfopolyester having a Tg of −20° C. to 100° C. and an inherent viscosity of 0.1 to 1.1 dL/g comprising:

(A) 85 to 100 mole percent, based on total moles of acid, of a dicarboxylic acid which does not contain a metal sulfonate group, said dicarboxylic acid being selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms;

(B) 2.5 to 20 mole percent, based on total moles of acid and glycol, of a difunctional sulfomonomer selected from the group consisting of a dicarboxylic acid or ester thereof containing a metal sulfonate group bonded directly to an aromatic ring, a diol containing a metal sulfonate group bonded directly to an aromatic ring, and a hydroxy acid containing a metal sulfonate group bonded directly to an aromatic ring;

(C) 0.1 to 10 mole percent, based on total moles of glycol, of a high molecular weight polyethylene glycol having the structure:

wherein n is 20 to 500, and the mole percent of the high molecular weight polyethylene glycol within said range is inversely proportional to the quantity of n within said range;

(D) 25 to 99.9 mole percent, based on total moles of glycol, of a low molecular weight polyethylene glycol having the structure:

wherein n' is 2 to 6;

the sulfopolyester containing substantially equal molar proportions of acid equivalents (100 mole percent) and glycol equivalents (100 mole percent).

DESCRIPTION OF THE INVENTION

The sulfopolyesters of the present invention are linear, water-dispersible sulfopolyesters. The term "water-dispersible" is often used interchangeably with other descriptors, such as "water dissipatable", "water-soluble", or "water-dispellable". In the context of this invention, all of these terms are to refer to the activity of water or a mixture of water and a water-miscible organic cosolvent on the sulfopolyesters described herein. It is intended for this terminology to include conditions where the sulfopolyester is dissolved to form a true solution or is dispersed within the aqueous medium to obtain a stable product. Often, due to the statistical nature of sulfopolyester compositions, it is possible to have soluble and dispersible fractions when a single sulfopolyester is acted upon by an aqueous medium.

The linear, water-dispersible sulfopolyesters are prepared using a dicarboxylic acid, component (A), which does not contain a metal sulfonate group; a difunctional sulfomonomer, component (B); a high molecular weight polyethylene glycol, component (C); a low molecular weight polyethylene glycol, component (D); and optionally a glycol, component (E), which does not include polyethylene glycol.

The linear, water-dispersible sulfopolyesters contain substantially equimolar proportions of acid (100 mole percent) and glycol (100 mole percent) equivalents, such that the total of acid and glycol equivalents is equal to 200 mole percent. The water-dispersible sulfopolyesters have an inherent viscosity of 0.1 to 1.1 dL/g, preferably 0.2 to 0.7 dL/g, and more preferably 0.3 to 0.5 dL/g.

Component (A) is a dicarboxylic acid which does not contain a metal sulfonate group. Dicarboxylic acids useful as component (A) are aromatic dicarboxylic acids preferably having 8 to 14 carbon atoms, saturated aliphatic dicarboxylic acids preferably having 4 to 12 carbon atoms, and cycloaliphatic dicarboxylic acids preferably having 8 to 12 carbon atoms. Specific examples of dicarboxylic acids to be used as component (A) include: succinic, glutaric, adipic, azelaic, sebacic, fumaric, maleic, itaconic, 1,3-cyclohexane dicarboxylic, 1,4-cyclohexanedicarboxylic, diglycolic, 2,5-norbornanedicarboxylic, phthalic, terephthalic, 1,4-naphthalenedicarboxylic, 2,5-naphthalenedicarboxylic, diphenic, 4,4'-oxydibenzoic, 4,4'-sulfonyldibenzoic, and isophthalic acid. Mixtures of two or more dicarboxylic acids may also be used. The preferred dicarboxylic acids are isophthalic acid and terephthalic acid.

It is to be understood that the use of the corresponding acid anhydrides, esters, and acid chlorides of these dicarboxylic acids is included in the term "dicarboxylic acid". Preferred diesters are dimethyl terephthalate, dimethyl isophthalate, and dimethyl-1,4-cyclohexanedicarboxylate. Although the methyl ester is the most preferred, it is also acceptable to use higher order alkyl esters, such as ethyl, propyl, isopropyl, butyl, and so forth. In addition, aromatic esters, particularly phenyl, may be used.

The dicarboxylic acid, component (A), is present in an amount of 85 to 100 mole percent, based on total moles of acid in the sulfopolyester. Preferably, the amount of dicarboxylic acid, component (A) is 85 to 95 mole percent, based on total moles of acid in the sulfopolyester.

Component (B) is a difunctional sulfomonomer which is selected from a dicarboxylic acid or ester thereof containing a metal sulfonate group (—SO$_3$M), a glycol containing a metal sulfonate group, or a hydroxy acid containing a metal sulfonate group. The sulfonate group has a cation which may be a metal or a non-metallic cation. Examples of suitable metal cations are Li$^+$, Na$^+$, and K$^+$. An example of a suitable non-metallic cation is a nitrogenous base. The nitrogen base may be an aliphatic, cycloaliphatic, or aromatic compound having an ionization constant in water at 25° C. of $10^{-3}$ to $10^{-10}$, preferably $10^{-5}$ to $10^{-8}$. Examples of suitable nitrogen containing bases are ammonia, pyridine, morpholine, and piperidine.

The choice of cation may influence the water-dispersibility of the sulfopolyester. Depending on the end-use application of the sulfopolyester, either a more or less easily dispersible product may be desirable. It is possible to prepare the polyester using, for example, a sodium sulfonate salt and then by ion-exchange methods replace the sodium with a different ion, such as zinc, when the sulfopolyester is in the dispersed form. This type of ion-exchange procedure is generally superior to preparing the sulfopolyester with divalent and trivalent salts inasmuch as the sodium salts are usually more soluble in the sulfopolyester reactant melt-phase. Also, the ion-exchange procedure is usually necessary to obtain the nitrogenous counterions, since amine salts tend to be unstable at typical melt processing conditions.

The difunctional sulfomonomer contains a sulfonate salt group which is attached to an aromatic acid nucleus, such as benzene, naphthalene, diphenyl, oxydiphenyl, sulfonyldiphenyl, or methylenediphenyl. Preferred results are obtained through the use of sulfophthalic acid, sulfoterephthalic acid, sulfoisophthalic acid, 4-sulfonaphthalene-2,7-dicarboxylic acid, and their esters. Particularly superior results are achieved when the difunctional sulfomonomer is 5-sodiosulfoisophthalic acid or esters thereof. The difunctional sulfomonomer is present in an amount of 2.5 to 20 mole percent, based on the total moles of acid and glycol in the sulfopolyester. Preferably, the difunctional sulfomonomer is present in an amount of 5 to 12 mole percent, more preferably 5 to 10 mole percent, based on the total moles of acid and glycol in the sulfopolyester.

Optionally, the sulfopolyesters of the present invention are prepared using up to 25 mole percent, based on the total moles of acid and glycol in the sulfopolyester, of a hydroxycarboxylic acid. Useful hydroxycarboxylic acids are aromatic, cycloaliphatic, and aliphatic hydroxycarboxylic acids. The hydroxycarboxylic acids contain 2 to 20 carbon atoms, a —CH$_2$OH group and a COOH or COOR$^1$ group wherein R$^1$ is an alkyl, alicyclic or aryl group having 1 to 6 carbon atoms.

Component (C) is a high molecular weight polyethylene glycol block. The high molecular weight polyethylene glycol block is used to place hydrophilic, but non-ionic blocks within the sulfopolyester backbone. The high molecular weight polyethylene glycol has the formula HO—(CH$_2$CH$_2$—O)$_n$—H where n is 20 to 500. The term "block" generally refers to the incorporation of an oligomeric or polymer segment, consisting of two or more repeat units, within a secondary, dissimilar polymer structure. The term "block" for purposes of the present invention refers to incorporating the high molecular weight polyethylene glycol block segments having 20 to 500 repeat units, preferably 20 to 225 repeat units, in the sulfopolyester. More preferably, especially for sizing applications, the sulfopolyester contains a high molecular weight polyethylene glycol segment having 20 to 100 repeat units.

Based on the values of n being 20 to 225, the molecular weight ranges from about 900 to about 22,000 grams/mole. Preferably, the molecular weight range is 1000 to 4500 grams/mole, more preferably, 1000 to 2000 grams/mole. The sulfopolyester of the present invention must contain blocks of high molecular weight polyethylene glycol, component (C), to obtain excellent abrasion resistance, adhesion, and flexibility. The high molecular weight polyethylene glycol is present in an amount of 0.1 to 10 mole percent, preferably 0.2 to 5 mole percent, based on the total moles of glycol in the sulfopolyester.

The mole percent of the high molecular weight polyethylene glycol within the range of 0.1 to 10 mole percent is inversely proportional to the quantity of n within said range. As the molecular weight of the polyethylene glycol, component (C), is increased, the mole percent of the polyethylene glycol is decreased. For example, a polyethylene glycol having a molecular weight of 1000 grams/mole may constitute up to 10 mole percent of the total glycol, while a polyethylene glycol having a molecular weight of 10,000 would typically be incorporated at a level of less than one mole percent of the total glycol. The high molecular weight polyethylene glycol is commercially available under the designation "CARBOWAX", a product of Union Carbide.

It is important to note that a block architecture may have a deleterious effect on the performance properties of the sulfopolyester. For example, a high content of certain high molecular weight polyethylene glycols in the final sulfopolyester may lend unacceptable water-sensitivity to a particular article of manufacture.

Component (D) is a low molecular weight polyethylene glycol. The low molecular weight polyethylene glycol has the formula HO—(CH$_2$CH$_2$O)$_{n'}$—H where n' is 2 to 6. The low molecular weight polyethylene glycol is selected from: diethylene glycol, triethylene glycol, tetraethylene glycol, pentaethylene glycol, and hexaethylene glycol. Preferrably, the low molecular weight polyethylene glycol is diethylene glycol or triethylene glycol. The low molecular weight polyethylene glycol is present in an amount of 25 to 99.9 mole percent, preferably 50 to 75 mole percent, based on the total moles of glycol in the sulfopolyester.

It is important to note that certain glycols may be formed in-situ, due to side reactions that may be controlled by varying the process conditions. For example, varying proportions of diethylene, triethylene, and tetraethylene glycols from ethylene glycol may be formed due to an acid-catalyzed dehydration, which occurs readily when a buffer is not added to raise the pH of the reaction mixture. Additional compositional latitude is possible if a buffer is omitted from a feed containing various proportions of ethylene and diethylene glycols or from a feed containing ethylene, diethylene, and triethylene glycols.

Component (E) is a glycol which does not include polyethylene glycol. Component (E) is not necessary to prepare the sulfopolyesters of the present invention. However, when the sulfopolyester is used to prepare a sizing composition, component (E) is necessary. Component (E) includes cycloaliphatic glycols preferably having 6 to 20 carbon atoms and aliphatic glycols preferably having 3 to 20 carbon atoms. Specific examples of such glycols are ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, and p-xylylenediol. Mixtures of diols may also be used.

If component (E) is used to prepare the sulfopolyester, component (E) is used in an amount of 0.1 to 74.9 mole percent, based on total moles of glycol in the sulfopolyester. When the sulfopolyester is used to prepare a sizing composition, component (E) is used in an amount of 25 to 74.9 mole percent, based on total moles of glycol in the sulfopolyester. Preferably, component (E) is ethylene glycol or 1,4-cyclohexanedimethanol.

The sulfopolyesters of the present invention are preferably prepared using a buffer. Buffers and their use are well known in the art and do not require extensive discussions. Preferred buffers include sodium acetate, potassium acetate, lithium acetate, sodium phosphate monobasic, potassium phosphate dibasic and sodium carbonate. The buffer is present in an amount of up to 0.2 moles per mole of difunctional sulfomonomer, component (B). Preferably, the buffer is present in an amount of about 0.1 moles per mole of difunctional sulfomonomer.

A process for preparing the sulfopolyesters of the present invention involves an ester-interchange or esterification stage and a polycondensation stage. The ester-interchange or esterification, is conducted under an inert atmosphere at a temperature of 150° to 250° C. for 0.5 to 8 hours, preferably from 180° to 230° C. for 1 to 4 hours. The glycols, depending on their reactivities and the specific experimental conditions employed, are commonly used in molar excesses of 1.05–2.5 moles per total moles of acid-functional monomers. The second stage, referred to as polycondensation, is conducted under reduced pressure at a temperature of 230° to 350° C., preferably 250° to 310° C., and more preferably 260° to 290° C. for 0.1 to 6 hours, preferably 0.25 to 2 hours. Stirring or appropriate conditions are used in both stages to ensure adequate heat transfer and surface renewal of the reaction mixture. The reactions of both stages are facilitated by appropriate catalysts, especially those well-known in the art, such as alkoxy titanium compounds, alkali metal hydroxides and alcoholates, salts of organic carboxylic acids, alkyl tin compounds, metal oxides, and so forth. A three-stage manufacturing procedure, similar to the disclosure of U.S. Pat. No. 5,290,631 [7], which is hereby incorporated by reference, may also be used, particularly when a mixed monomer feed of acids and esters is employed. Dispersions may be obtained by adding molten or solid sulfopolyester into water with sufficient agitation.

The sulfopolyesters of the present invention may be used advantageously as sizing compositions for textile yarns made from linear polyesters. When multifilament polyesters yarns are fabricated into textiles it is desirable to treat the warp yarn, before weaving, with a sizing composition that adheres and binds several filaments together. The treatment process, known as "sizing", imparts strength and abrasion resistance to the yarn during the weaving process. It is also critical that the sizing composition be completely removable from the woven fabric. Increased abrasion resistance will result in fewer breaks during the weaving process, which improves the quality of the textile product. Thus, one aspect of this invention is directed toward sizing compositions and fibrous articles of manufacture sized therewith. Although the described application is in reference to polyester yarns, such as poly(ethylene terephthalate) or poly(1,4-cyclohexanedimethylene terephthalate), the compositions described hereinafter may be used as sizes for a variety of natural and synthetic yarns. Examples of non-polyester yarns include rayon, acrylic, polyolefin, cotton, nylon, and cellulose acetate. Blends of polyester and non-polyester yarns are also within the scope of fibers that may be effectively sized.

It is necessary for the size compositions to possess adequate resistance to blocking, which is most critically manifested when the fiber is wound on a warp beam or bobbin and stored for extended periods of time under ambient conditions. Blocking causes the sized fibers to meld together, which prohibits them from being unwound at the desired time. The tendency for blocking to occur under both normal and extreme ambient conditions of temperature and humidity may be directly related to the Tg of the size composition. Therefore, a dry Tg ranging from 30° to 60° C., preferably 35° to 50° C. is required to avoid blocking problems. This requirement necessitates careful selection of the acid and glycol components. For example, too high a level of polyethylene glycol will detrimentally lower the Tg and result in blocking. In general, as the length or molecular weight of a polyethylene glycol monomer is increased, at a constant molar percentage of incorporation, the Tg of the final sulfopolyester will be proportionately decreased.

Adhesion, flexibility and, in part, desizability and water resistance are also related to the polyethylene glycol molecular weight and content of the sulfopolyester. As the polyethylene glycol content is increased, hydrophilicity, flexibility, and adhesion are also increased. If the polyethylene glycol content and/or molecular weight is too high, then the resulting size will have a low Tg and marginal water resistance. The properties of desizability, water resistance, flexibility, and adhesion are also related to the content of sulfomonomer, component (B). If the sulfomonomer level is too high, the water resistance, flexibility, and economics of the size will be lessened, while a functionally low level of sulfomonomer tends to detract from the adhesion and will prevent adequate desizing after the weaving operation.

The materials and testing procedures used for the results shown herein are as follows:

Duplan Cohesion Tester measures abrasion resistance for a sized yarn. The Duplan test is performed on samples of sized yarn, under constant tension, that are abraded by friction plates moving back and forth over said yarn at a constant rate. The average number of cycles to separate the yarn filaments is reported as the abrasion resistance or Duplan value. Higher Duplan values are a direct indicator of the suitability of the sulfopolyester as a size material.

Glass transition temperature (Tg) was determined using a differential scanning calorimeter (DSC).

Inherent viscosity (I.V.) was measured at 23° C. using 0.50 grams of polymer per 100 ml of a solvent consisting of 60% by weight phenol and 40% by weight tetrachloroethane.

The process of the present invention will be further illustrated by a consideration of the following examples, which are intended to be exemplary of the invention. All parts and percentages in the examples are on a weight basis unless otherwise stated.

EXAMPLE I

Preparation of Water-Dispersible Block Polyester Containing 12 Mole% 5-Sodiosulfoisophthalate and 5 Mole % polyethylene glycol 1000.

A 500 mL round bottom flask equipped with a ground-glass head, agitator shaft, nitrogen inlet, and a sidearm to allow for removal of volatile materials, was charged with 85.6 grams (0.44 moles) dimethyl terephthalate, 17.8 grams (0.06 moles) dimethyl-5-sodiosulfoisophthalate, 42.2 grams (0.68 moles) ethylene glycol, 31.3 grams (0.30 moles) diethylene glycol, 25.0 grams (0.025 moles) CARBO-WAX® polyethylene glycol 1000, 0.49 grams (0.006 moles) anhydrous sodium acetate, and 0.5 mL of a 1.46% (w/v) solution of titanium isopropoxide in n-butanol. The flask was purged with nitrogen and immersed in a Belmont metal bath at 200° C. for 90 minutes and 210° C. for an additional 90 minutes under a slow nitrogen sweep with sufficient agitation to complete the transesterification. The temperature was elevated to 280° C. and a vacuum of at least 0.5 mm of Hg was held for 30 minutes to perform the polycondensation. The vacuum was displaced with a nitrogen atmosphere and the sulfopolyester product was allowed to cool before being removed from the flask.

The sulfopolyester appeared clear and slightly yellow. An inherent viscosity of 0.52 dL/g was determined. NMR analysis indicated that the actual glycol composition was 60 mole % ethylene glycol (EG), 35 mole % diethylene glycol (DEG), and 5 mole % polyethylene glycol 1000 (PEG 1000). A glass transition temperature (Tg) of 28° C. was obtained for the sulfopolyester from thermal analysis by DSC. Tensile properties were obtained according to ASTM-D638. A tough, elastomeric material was observed as the yield stress and yield elongation were 15 MPa and 7%, respectively, while the break stress and elongation at break were 9 MPa and 175%, respectively.

EXAMPLE II

Preparation of Water-Dispersible Block Polyester Containing 12 Mole % 5-Sodiosulfoisophthalate and 0.5 Mole % PEG 10,000.

The apparatus and procedure described in Example I was repeated except that polycondensation time was changed. A 500 mL round bottom flask was charged with 85.4 grams (0.44 moles) dimethyl terephthalate, 17.8 grams (0.06 moles) dimethyl-5-sodiosulfoisophthalate, 42.2 grams (0.68 moles) ethylene glycol, 31.8 grams (0.30 moles) diethylene glycol, 25.0 grams (0.0025 moles) polyethylene glycol (Mn=10,000 grams/mole), 0.49 grams (0.006 moles) sodium acetate, and 0.5 mL of a 1.46% (w/v) solution of titanium (IV) isopropoxide in n-butanol. The polycondensation was performed at 280° C. for 17 minutes at a pressure 0.35.mm of Hg.

The recovered sulfopolyester had an inherent viscosity of 0.63 dl/g and a Tg of 19° C. Analysis by NMR indicated that the actual glycol composition was 58 mole % ethylene glycol, 41.5 mole % diethylene glycol, and 0.5 mole % PEG 10,000 (PEG 10,000).

EXAMPLE III

Preparation of Water-Dispersible Block Polyester Containing 11 Mole % 5-Sodiosulfoisophthalate and 2 Mole % PEG 1000.

The apparatus and procedure described in Example I was used except that the transesterification and polycondensation times were changed. A 500 mL round bottom flask was charged with 67.9 grams (0.35 moles) dimethyl terephthalate, 19.4 grams (0.10 moles) dimethyl isophthalate, 14.8 grams (0.05 moles) dimethyl-5-sodiosulfoisophthalate, 24.2 grams (0.39 moles) ethylene glycol, 31.8 grams (0.30 moles) diethylene glycol, 7.5 grams (0.008 moles) CARBOWAX® polyethylene glycol 1000, 0.4 grams (0.005 moles) sodium acetate, and 0.35 mL of a 1.46% (w/v) solution of titanium(IV) isopropoxide in n-butanol. The polyesterification was conducted at 200° C. for 60 minutes and 225° C. for 90 minutes, followed by a polycondensation stage at 280° C. and 0.4 mmHg for 37 minutes.

The recovered sulfopolyester had an I.V. of 0.40 dl/g and a Tg of 45° C. NMR analysis indicated the sulfopolyester acid composition consisted of 69 mole % terephthalic acid, 20 mole % isophthalic acid, and 11 mole % 5-sodiosulfoisophthalic acid units. NMR analysis indicated the sulfopolyester glycol composition consisted of 57 mole % EG, 41 mole % DEG, and 2.0 mole % polyethylene glycol 1000 (PEG 1000).

EXAMPLE IV

Preparation of Water-Dispersible Block Copolyester Containing 11 Mole % 5-Sodiosulfoisophthalate and 6 Mole % PEG 300.

The apparatus and procedure described in Example I was used except that the transesterification was conducted at 200° C. for 60 minutes and 230° C. for 90 minutes, while the polycondensation was performed at 280° C. and 0.3 mm of Hg for 34 minutes. A 500 mL round bottom flask was charged with 67.9 grams (0.35 moles) dimethyl terephthalate, 19.4 grams (0.10 moles) dimethyl isophthalate, 14.8 grams (0.05 moles) dimethyl-5-sodiosulfoisophthalate, 27.3 grams (0.44 moles) ethylene glycol, 21.2 grams (0.20 moles) diethylene glycol, 7.5 grams (0.025 moles) CARBOWAX® polyethylene glycol 300 (Mn=300 grams/mole), 0.41 grams (0.005 moles) sodium acetate, and 0.32 mL of a 1.46% (w/v) solution of titanium (IV) isopropoxide in n-butanol.

The recovered sulfopolyester had an I.V. of 0.35 dL/g and a Tg of 40° C. NMR analysis indicated the sulfopolyester acid composition consisted of 70 mole % terephthalic acid, 19 mole % isophthalic acid, and 11 mole % 5-sodiosulfoisophthalic acid units. NMR analysis indicated the sulfopolyester glycol composition consisted of 58 mole % EG, 36 mole % DEG, and 5.9 mole % polyethylene glycol 300 (PEG 300).

EXAMPLE V

Preparation of Water-Dispersible Polyester Containing 10 Mole % 5-Sodiosulfoisophthalate and 3.2 Mole % PEG 600.

The apparatus described in Example I and the procedure described in Example IV was used except that the time of polycondensation was increased to 50 minutes. A 500 mL round bottom flask was charged with 67.9 grams (0.35 moles) dimethyl terephthalate, 19.4 grams (0.10 moles) dimethylisophthalate, 14.8 grams (0.05 moles) dimethyl-5-sodiosulfoisophthalate, 27.3 grams (0.44 moles) ethylene glycol, 21.2 grams (0.20 moles) diethylene glycol, 9.0 grams (0.015 moles) CARBOWAX® polyethylene glycol 600 (Mn=570–630 grams/mole), 0.4 grams (0.005 moles) sodium acetate, and 0.33 mL Of a 1.46% (w/v) solution of titanium(IV) isopropoxide in n-butanol.

The recovered sulfopolyester had an I.V. of 0.35 dL/g and a Tg of 46° C. NMR analysis indicated the sulfopolyester acid composition consisted of 69 mole % terephthalic acid, 21 mole % isophthalic acid, and 10 mole % 5-sodiosulfoisophthalic acid units. NMR analysis indicated the sulfopolyester glycol composition consisted of 63 mole % EG, 34 mole % DEG, and 3.2 mole % polyethylene glycol 600 (PEG 600).

EXAMPLE VI

Preparation of Water-Dispersible Polyester Containing 11 Mole % 5-Sodiosulfoisophthalate.

The apparatus and procedure described in Example I was used. A 500 mL round bottom flask was charged with 77.6 grams (0.40 moles) dimethyl terephthalate, 19.4 grams (0.10 moles) dimethyl isophthalate, 16.28 grams (0.055 moles) dimethyl-5-sodiosulfoisophthalate, 62.0 grams (1.00 moles) ethylene glycol, and 0.38 mL of a 1.46% (w/v) solution of titanium(IV) isopropoxide in n-butanol. The flask was purged with nitrogen and immersed in a Belmont metal bath at 200° C. for 60 minutes and 230° C. for an additional 120 minutes under a slow nitrogen sweep with sufficient agitation to complete the transesterification. The temperature was elevated to 280° C. and a vacuum of at least 0.5 mm of Hg was held for 93 minutes to perform the polycondensation.

The recovered sulfopolyester had an I.V. of 0.42 dL/g and a Tg of 55° C. NMR analysis indicated the sulfopolyester acid composition consisted of 64 mole % terephthalic acid, 25 mole % isophthalic acid, and 11 mole % 5-sodiosulfoisophthalic acid units. NMR analysis indicated the sulfopolyester glycol composition consisted of 67 mole % EG, 26 mole % DEG, and 7 mole % triethylene glycolate (TEG) units.

The sulfopolyesters prepared in Examples III, IV, V, and VI were dispersed in deionized water at a solids level of 30 weight percent and diluted appropriately for slashing. Film tests were obtained by casting and drying circular film dots on a sheet of mylar. Fiber testing was accomplished by slashing a 40 filament/150 denier warp drawn polyester yarn through an aqueous dispersion of the size composition and drying.

Pass and Fail for the Adhesion test was judged by the number of dots out of 40 that failed to adhere to the film after applying and removing adhesive tape. If 5 or more dots out of 40 did not adhere to the film, the sulfopolyester size was judged to be a failure. Pass and Fail for the Flexibility test was judged by the number of dots out of 40 that cracked after subjecting the film to a rapid flexing motion for 15 seconds. If 5 or more dots out of 40 cracked, the sulfopolyester size was judged to be a failure. The test results are summarized in Table I.

TABLE I

| Data for Film and Fiber Properties | | | | | |
|---|---|---|---|---|---|
| Ex. | Composition (Mole %)[1] | Pickup % | Adhesion | Flexibility | Abrasion Cycles |
| III | T = 69<br>I = 20<br>SIP = 11<br>EG = 57<br>DEG = 41<br>PEG 1000 = 2.0 | 4.5 | PASS | PASS | 100 |
| IV | T = 70<br>I = 19<br>SIP = 11<br>EG = 58<br>DEG = 36<br>PEG 300 = 5.9 | 4.8 | PASS | FAIL | 30 |
| V | T = 69<br>I = 21<br>SIP = 10<br>EG = 63<br>DEG = 34<br>PEG 600 = 3.2 | 4.3 | PASS | FAIL | 40 |

TABLE I-continued

| Data for Film and Fiber Properties | | | | | |
|---|---|---|---|---|---|
| Ex. | Composition (Mole %)[1] | Pickup % | Adhesion | Flexibility | Abrasion Cycles |
| VI | T = 64<br>I = 25<br>SIP = 11<br>EG = 67<br>DEG = 26<br>TEG = 7 | 4.2 | FAIL | FAIL | 65 |

[1]Total acid and glycol = 200 mole %
T = dimethyl terephthalate
I = dimethyl isophthalate
SIP = dimethyl-5-sodiosulfoisophthalate
EG = ethylene glycol
DEG = diethylene glycol
TEG = triethylene glycolate The results in Table I clearly demonstrate the efficacy of the present invention as a textile size. Examples IV, V, and VI were used as comparison examples. Pickup level or the amount of dry size applied to the fiber was essentially constant for all of the examples which had essentially the same ratios of terephthalic acid to isophthalic acid to SIP. Example VI which is the sulfopolyester that did not contain any PEG failed both the adhesion and flexibility tests and had only 65% of the abrasion resistance that was shown by Example III. Examples IV and V which contain the lower molecular weight polyethylene glycols both failed the flexibility test and exhibited greatly inferior abrasion resistance compared to Example III. It is important to note that the level of polyethylene glycol, based on the weight percent of total sulfopolyester, was constant in Examples II, IV and V.

This invention involves the use of certain critical ranges of high molecular weight polyethylene glycol blocks and low molecular weight polyethylene glycols used in the preparation of water-dispersible sulfopolyesters result in the sulfopolyesters exhibiting greater flexibility, improved adhesion, and increased abrasion resistance.

Many variations will suggest themselves to those skilled in this art in light of the above detailed description. All such obvious modifications are within the full intended scope of the appended claims.

What is claimed is:

1. A linear, water-dispersible, sulfopolyester having a Tg of −20° C. to 100° C. and an inherent viscosity of 0.1 to 1.1 dl/g comprising:

(A) 85 to 100 mole percent, based on total moles of acid, of a dicarboxylic acid which does not contain a metal sulfonate group, said dicarboxylic acid being selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms;

(B) 2.5 to 20 mole percent, based on total moles of acid and glycol, of a difunctional sulfomonomer selected from the group consisting of a dicarboxylic acid or ester thereof containing a metal sulfonate group bonded directly to an aromatic ring, a diol containing a metal sulfonate group bonded directly to an aromatic ring, and a hydroxy acid containing a metal sulfonate group bonded directly to an aromatic ring;

(C) 0.1 to 10 mole percent, based on total moles of glycol, of a high molecular weight polyethylene glycol having the structure:

H—(OCH$_2$CH$_2$)$_n$—OH wherein n is 20 to 500, and the mole percent of the high molecular weight polyethylene glycol within said range is inversely proportional to the quantity of n within said range;

(D) 25 to 99.9 mole percent, based on total moles of glycol, of a low molecular weight polyethylene glycol having the structure:

H—(OCH$_2$CH$_2$)$_{n'}$—OH wherein n' is 2 to 6;
the sulfopolyester containing substantially equal molar proportions of acid equivalents (100 mole percent) and glycol equivalents (100 mole percent).

2. The sulfopolyester of claim 1 wherein the sulfopolyester is prepared using a buffer in an amount of 0.001 to 0.2 moles per mole of difunctional sulfomonomer, component (B).

3. The sulfopolyester of claim 2 wherein the buffer is present in an amount of 0.1 moles per mole of difunctional sulfomonomer.

4. The sulfopolyester of claim 2 wherein the buffer is selected from the group consisting of sodium acetate, potassium acetate, lithium acetate, sodium phosphate monobasic, potassium phosphate dibasic and sodium carbonate.

5. The sulfopolyester of claim 4 wherein the buffer is sodium acetate.

6. The sulfopolyester of claim 1 wherein the sulfopolyester is prepared using a hydroxycarboxylic acid.

7. The sulfopolyester of claim 1 wherein the difunctional sulfomonomer, component (B), is selected from the group consisting of sulfophthalic acid, sulfoterephthalic acid, sulfoisophthalic acid, 4-sulfonaphthalene-2,7-dicarboxylic acid, and esters thereof.

8. The sulfopolyester of claim 7 wherein the difunctional sulfomonomer is 5-sodio-sulfoisophthalic acid.

9. The sulfopolyester of claim 1 wherein the sulfopolyester is prepared using 0.1 to 74.9 mole percent, based on total moles of glycol, of a glycol (E) which is not polyethylene glycol, said glycol being selected from the group consisting of cycloaliphatic glycols having 6 to 20 carbon atoms, aliphatic glycols having 3 to 20 carbon atoms, and mixtures thereof.

10. The sulfopolyester of claim 9 wherein the glycol, component (E), is selected from the group consisting of ethylene glycol, propylene glycol, 1,3-propanediol, 2,4-dimethyl-2-ethylhexane-1,3-diol, 2,2--dimethyl-1,3-propanediol, 2-ethyl-2-butyl-1,3-propanediol, 2-ethyl-2-isobutyl-1,3--propanediol, 1,3--butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol, and mixtures thereof.

11. The sulfopolyester of claim 10 wherein the glycol, component (E) is selected from the group consisting of ethylene glycol, 1,4-cyclohexanedimethanol and mixtures thereof.

12. A linear, water-dispersible, sulfopolyester having a Tg of −20° C. to 100° C. and an inherent viscosity of 0.1 to 1.1 dl/g comprising:

(A) 85 to 100 mole percent, based on total moles of acid, of a dicarboxylic acid selected from the group consisting of succinic, glutaric, adipic, azelaic, sebacic, fumaric, maleic, itaconic, 1,3-cyclohexane dicarboxylic, 1,4-cyclohexanedicarboxylic, diglycolic, 2,5-norbornanedicarboxylic, phthalic, terephthalic, 1,4-naphthalenedicarboxylic, 2,5-naphthalenedicarboxylic, diphenic, 4,4'-oxydibenzoic, 4,4'-sulfonyldibenzoic, isophthalic, and mixtures thereof;

(B) 2.5 to 20 mole percent, based on total moles of acid and glycol, of a difunctional sulfomonomer selected from the group consisting of a dicarboxylic acid or ester thereof containing a metal sulfonate group bonded directly to an aromatic ring, a diol containing a metal sulfonate group bonded directly to an aromatic ring, and a hydroxy acid containing a metal sulfonate group bonded directly to an aromatic ring;

(C) 0.1 to 10 mole percent, based on total moles of glycol, of a high molecular weight polyethylene glycol having the structure:

H—(OCH$_2$CH$_2$)$_n$—OH wherein n is 20 to 500, and the mole percent of the high molecular weight polyethylene glycol within said range is inversely proportional to the quantity of n within said range;

(D) 25 to 99.9 mole percent, based on total moles of glycol, of a low molecular weight polyethylene glycol selected from the group consisting of diethylene glycol, triethylene glycol, tetraethylene glycol, pentaethylene glycol, and hexaethylene glycol;
the sulfopolyester containing substantially equal molar proportions of acid equivalents (100 mole percent) and glycol equivalents (100 mole percent).

13. A linear, water-dispersible, sulfopolyester having a Tg of −20° C. to 100° C. and an inherent viscosity of 0.1 to 1.1 dl/g comprising:

(A) 85 to 100 mole percent, based on total moles of acid, of a dicarboxylic acid which does not contain a metal sulfonate group, said dicarboxylic acid being selected from the group consisting of aromatic dicarboxylic acids having 8 to 14 carbon atoms, saturated aliphatic dicarboxylic acids having 4 to 12 carbon atoms, and cycloaliphatic dicarboxylic acids having 8 to 12 carbon atoms;

(B) 2.5 to 20 mole percent, based on total moles of acid and glycol, of a difunctional sulfomonomer selected from the group consisting of a dicarboxylic acid or ester thereof containing a metal sulfonate group bonded directly to an aromatic ring, a diol containing a metal sulfonate group bonded directly to an aromatic ring, and a hydroxy acid containing a metal sulfonate group bonded directly to an aromatic ring;

(C) 0.1 to 10 mole percent, based on total moles of glycol, of a high molecular weight polyethylene glycol having the structure:

H—(OCH$_2$CH$_2$)$_n$—OH wherein n is 20 to 500, and the mole percent of the high molecular weight polyethylene glycol within said range is inversely proportional to the quantity of n within said range;

(D) 25 to 99.9 mole percent, based on total moles of glycol, of a low molecular weight polyethylene glycol selected from the group consisting of diethylene glycol, triethylene glycol, tetraethylene glycol, pentaethylene glycol, and hexaethylene glycol; and (E) 0.1 to 74.9 mole percent, based on total moles of glycol, of a glycol which is not polyethylene glycol, said glycol being selected from the group consisting of cycloaliphatic glycols having 6 to 20 carbon atoms, aliphatic glycols having 3 to 20 carbon atoms, and mixtures thereof;

the sulfopolyester containing substantially equal molar proportions of acid equivalents (100 mole percent) and glycol equivalents (100 mole percent).

14. A fibrous article sized with a sizing composition comprising a linear, water-dispersible, sulfopolyester having a dry Tg of 35° C. to 50° C. and an inherent viscosity of 0.1 to 1.1 dl/g comprising repeat units from:

(A) 85 to 100 mole percent, based on total moles of acid, of a dicarboxylic acid selected from the group consisting of terephthalic acid, isophthalic acid, and mixtures thereof;

(B) 2.5 to 20 mole percent, based on total moles of acid and glycol, of a difunctional sulfomonomer selected from the group consisting of a dicarboxylic acid or ester thereof containing a metal sulfonate group bonded directly to an aromatic ring, and a diol containing a metal sulfonate group bonded directly to an aromatic ring;

(C) 0.1 to 5 mole percent, based on total moles of glycol, of a high molecular weight polyethylene glycol having the structure:

$$H-(OCH_2CH_2)_n-OH$$

wherein n is 20 to 100, and the mole percent of the high molecular weight polyethylene glycol within said range is inversely proportional to the quantity of n within said range;

(D) 25 to 99.9 mole percent, based on total moles of glycol, of a low molecular weight polyethylene glycol selected from the group consisting of diethylene glycol, triethylene glycol, tetraethylene glycol, pentaethylene glycol, and hexaethylene glycol;

(E) 25 to 74.9 mole percent, based on total moles of glycol, of a glycol which is not polyethylene glycol, said glycol being selected from the group consisting of cycloaliphatic glycols having 6 to 20 carbon atoms, aliphatic glycols having 3 to 20 carbon atoms, and mixtures thereof;

the sulfopolyester containing substantially equal molar proportions of acid equivalents (100 mole percent) and glycol equivalents (100 mole percent).

15. The fibrous article of claim 14 wherein the dicarboxylic acid, component (A), is isophthalic acid.

16. The fibrous article of claim 14 wherein the dicarboxylic acid, component (A), is terephthalic acid.

17. The fibrous article of claim 14 wherein the difunctional sulfomonomer, component (B), is selected from the group consisting of sulfophthalic acid, sulfoterephthalic acid, sulfoisophthalic acid, 4-sulfonaphthalene-2,7-dicarboxylic acid, and esters thereof.

18. The fibrous article of claim 17 wherein the difunctional sulfomonomer is 5-sodio-sulfoisophthalic acid.

19. The fibrous article of claim 14 wherein the low molecular weight polyethylene glycol, component (D), is selected from the group consisting of diethylene glycol, triethylene glycol, and tetraethylene glycol.

20. The fibrous article of claim 14 wherein the glycol, component (E) is selected from the group consisting of ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol, and mixtures thereof.

21. The fibrous article of claim 20 wherein the glycol, component (E) is selected from the group consisting of ethylene glycol, 1,4-cyclohexanedimethanol and mixtures thereof.

22. The fibrous article of claim 14 wherein the sulfopolyester is prepared using a buffer in an amount of 0.001 to 0.2 moles per mole of difunctional sulfomonomer, component (B).

23. The fibrous article of claim 22 wherein the buffer is present in an amount of 0.1 moles per mole of difunctional sulfomonomer.

24. The fibrous article of claim 22 wherein the buffer is selected from the group consisting of sodium acetate, potassium acetate, lithium acetate, sodium phosphate monobasic, potassium phosphate dibasic and sodium carbonate.

25. The fibrous article of claim 24 wherein the buffer is sodium acetate.

26. The fibrous article of claim 14 wherein said fibrous article is a textile yarn.

27. The fibrous article of claim 26 wherein said textile yarn is made from a polyester.

28. The fibrous article of claim 27 wherein said polyester is poly(ethylene terephthalate).

29. The fibrous article of claim 27 wherein said polyester is poly(1,4-cyclohexylenedimethylene terephthalate).

* * * * *

(12) REEXAMINATION CERTIFICATE (4760th)
United States Patent
George et al.

(10) Number: US 5,709,940 C1
(45) Certificate Issued: Apr. 8, 2003

(54) WATER-DISPERSIBLE BLOCK COPOLYESTERS

(75) Inventors: Scott E. George, Kingsport, TN (US); Bobby J. Sublett, Kingsport, TN (US)

(73) Assignee: Eastman Chemical Company, Kingsport, TN (US)

Reexamination Request:
No. 90/005,306, Mar. 25, 1999

Reexamination Certificate for:
Patent No.: 5,709,940
Issued: Jan. 20, 1998
Appl. No.: 08/651,246
Filed: May 21, 1996

Related U.S. Application Data

(63) Continuation of application No. 08/328,744, filed on Oct. 24, 1994, now abandoned.

(51) Int. Cl.$^7$ ................................. D02G 3/00
(52) U.S. Cl. .................. 428/364; 428/375; 428/394; 428/395; 524/604; 524/605; 528/290; 528/295; 528/298; 528/300; 528/301; 528/302; 528/307; 528/308
(58) Field of Search ............... 528/290, 295, 528/298, 300, 301, 302, 307, 308, 308.6, 272, 275; 524/604, 605, 81; 525/437, 444; 428/364, 395, 394, 480, 375

(56) References Cited

U.S. PATENT DOCUMENTS

| | | | |
|---|---|---|---|
| 3,018,272 A | 1/1962 | Griffing et al. ............... 260/75 |
| 3,033,822 A | 5/1962 | Kibler et al. ................. 260/47 |
| 3,075,952 A | 1/1963 | Coover et al. ................ 260/75 |
| 3,546,008 A | 12/1970 | Shields et al. ............ 117/138.8 |
| 3,734,874 A | 5/1973 | Kibler et al. ............ 260/29.2 E |
| 3,779,993 A | 12/1973 | Kibler et al. ............. 260/75 S |
| 4,101,274 A | 7/1978 | Beutler et al. ................. 8/173 |
| 4,156,073 A | 5/1979 | Login ......................... 528/295 |
| 4,158,083 A | 6/1979 | Login ......................... 428/389 |
| 4,167,395 A | 9/1979 | Engelhardt et al. ............ 8/173 |
| 4,168,145 A | 9/1979 | Hintermeier et al. .......... 8/173 |
| 4,215,026 A | 7/1980 | Login ..................... 260/292 E |
| 4,233,196 A | 11/1980 | Sublett ....................... 260/29.2 |
| 4,250,296 A | 2/1981 | Weckler et al. ............. 528/295 |
| 4,252,532 A | 2/1981 | Engelhardt et al. ............ 8/557 |
| 4,300,580 A | 11/1981 | O'Neill et al. ................. 132/7 |
| 4,304,901 A | 12/1981 | O'Neill et al. .............. 528/290 |
| 4,329,391 A | 5/1982 | McAlister ................... 428/265 |
| 4,480,085 A | 10/1984 | Larson ....................... 528/295 |
| 4,483,976 A | 11/1984 | Yamamoto et al. ......... 528/295 |
| 4,525,524 A | 6/1985 | Tung et al. .................. 524/601 |
| 4,598,142 A | 7/1986 | Hilbert et al. .............. 528/295 |
| 4,632,874 A | 12/1986 | Smith ......................... 428/394 |
| 4,946,932 A | 8/1990 | Jenkins ....................... 528/272 |
| 5,218,042 A | 6/1993 | Kuo et al. ................... 524/601 |
| 5,290,631 A | 3/1994 | Fleury et al. ............... 428/364 |
| 5,366,804 A | 11/1994 | Dugan ........................ 428/373 |
| 5,543,488 A | 8/1996 | Miller et al. ................. 528/277 |
| 5,552,495 A | 9/1996 | Miller et al. ................. 525/437 |
| 5,552,511 A | 9/1996 | Miller et al. ................. 528/277 |
| 5,571,876 A | 11/1996 | Miller et al. ................. 525/437 |
| 5,605,764 A | 2/1997 | Miller et al. ................. 428/480 |

FOREIGN PATENT DOCUMENTS

| | | |
|---|---|---|
| DE | 24 38 379 | 2/1978 |
| EP | 0 761 795 A2 | 3/1997 |
| JP | 37-12149 | 8/1962 |
| KR | 3026 | 10/1992 |
| WO | WO 92 02583 | 2/1992 |
| WO | WO 95/05413 | 2/1995 |

OTHER PUBLICATIONS

Um, Sung Ip et al., "Morphological Core/Shell Structure and Dispersion Stability of Water–Dispersible Copolyester Graft Polymerized with Acrylic Acid and Thyl Acrylatye", *Journal of Applied Polymer Sciences*, vol. 60, pp. 1587–1593 (1996).

Primary Examiner—J. M. Gray

(57) ABSTRACT

This invention relates to linear, water-dispersible sulfopolyesters prepared using high molecular weight polyethylene glycol blocks and low molecular weight polyethylene glycol. The high molecular weight polyethylene glycol has the formula $H-(OCH_2CH_2)_n-OH$ where n is 20 to 500, and the low molecular weight polyethylene glycol has the structure $H-(OCH_2CH_2)_{n'}-OH$ where n' is 2 to 6. The sulfopolyesters are useful as textile fiber sizes that possess improved adhesion flexiblity, and abrasion resistance.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, line 60 to column 5, line 9:

Component (E) is a glycol which does not include polyethylene glycol. Component (E) is not necessary to prepare the sulfopolyesters of the present invention. However, when the sulfopolyester is used to prepare a sizing composition, component (E) is necessary. Component (E) includes cycloaliphatic glycols preferably having 6 to 20 carbon atoms and aliphatic glycols preferably having [3] *2* to 20 carbon atoms. Specific examples of such glycols are ethylene glycol, propylene glycol, 1,3-propanediol, 2,4-dimethyl-2-ethylhexane-1,3-diol, 2,2-dimethyl-1,3-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, and p-xylylenediol. Mixtures of diols may also be used.

AS A RESULT OF REEXAMINATION, IT HAS BEEN DETERMINED THAT:

Claims 1–13 are cancelled.

Claim 14 is determined to be patentable as amended.

Claims 15–29, dependent on an amended claim, are determined to be patentable.

New claims 30–33 are added and determined to be patentable.

14. A fibrous article sized with a sizing composition comprising a linear, water-dispersible, sulfopolyester having a dry Tg of 35° C. to 50° C. and an inherent viscosity of 0.1 to 1.1 dl/g comprising [repeat units from] *the reaction product of*:

(A) 85 to 100 mole percent, based on total moles of acid, of a dicarboxylic acid selected from the group consisting of terephthalic acid, isophthalic acid, and mixtures thereof;

(B) 2.5 to 20 mole percent, based on total moles of acid and glycol, of a difunctional sulfomonomer selected from the group consisting of a dicarboxylic acid or ester thereof containing a metal sulfonate group bonded directly to an aromatic ring, and a diol containing a metal sulfonate group bonded directly to an aromatic ring;

(C) 0.1 to 5 mole percent, based on total moles of glycol, of a high molecular weight polyethylene glycol having the structure:

wherein n is 20 to 100, and the mole percent of the high molecular weight polyethylene glycol within said range is inversely proportional to the quantity of n within said range;

(D) 25 to 99.9 mole percent, based on total moles of glycol, of a low molecular weight polyethylene glycol selected from the group consisting of diethylene glycol, triethylene glycol, tetraethylene glycol, pentaethylene glycol, and hexaethylene glycol; *and*

(E) 25 to 74.9 mole percent, based on total moles of glycol, of a glycol which is not polyethylene glycol, said glycol being selected from the group consisting of cycloaliphatic glycols having 6 to 20 carbon atoms, aliphatic glycols having 3 to 20 carbon atoms, and mixtures thereof;

the sulfopolyester containing substantially equal molar proportions of acid equivalents (100 mole percent) and glycol equivalents (100 mole percent).

*30. The fibrous article of claim 14, wherein the molecular weight of said high molecular weight polyethylene glycol is at least 1000.*

*31. The fibrous article of claim 14, comprising less than 5 mole percent of said high molecular weight polyethylene glycol.*

*32. The fibrous article of claim 14, wherein the inherent viscosity of said sulfopolyester ranges from 0.3 to 1.1 dl/g.*

*33. The fibrous article of claim 14, wherein the molecular weight of said high molecular weight polyethylene glycol is at least 900.*

* * * * *